(No Model.)
G. D. COREY.
FRUIT JAR.
No. 349,630. Patented Sept. 21, 1886.
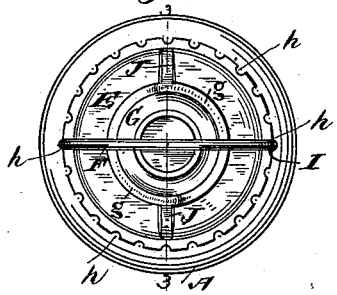
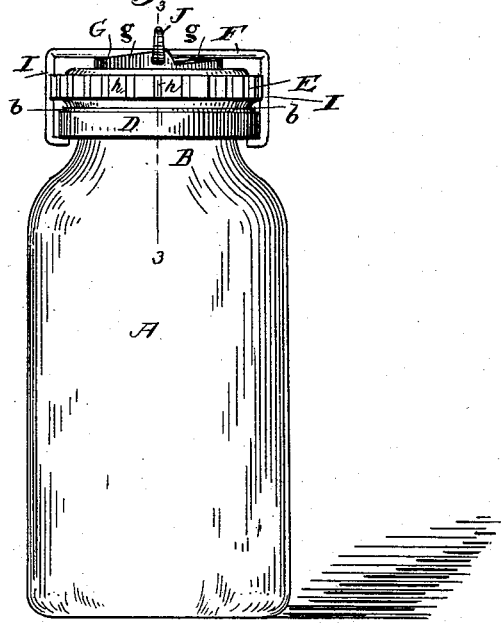
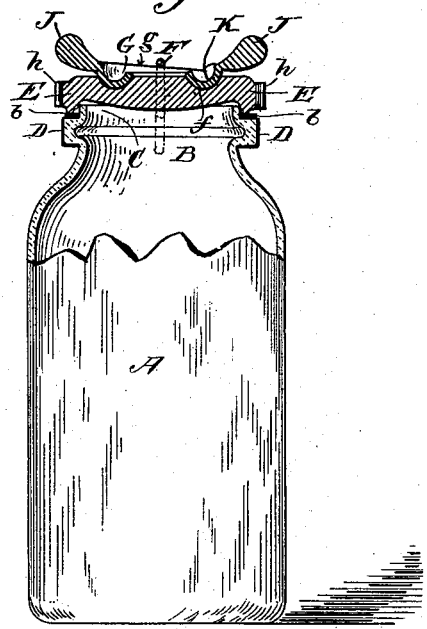
Witnesses
Wm. F. Bellows
Frances M. Brown.
Geo. D. Corey,
Inventor
by Brown Bros.
Attorneys.

UNITED STATES PATENT OFFICE.

GEORGE D. COREY, OF LOWELL, MASSACHUSETTS.

FRUIT-JAR.

SPECIFICATION forming part of Letters Patent No. 349,630, dated September 21, 1886.

Application filed September 30, 1885. Serial No. 178,660. (No model.)

*To all whom it may concern:*

Be it known that I, GEORGE D. COREY, of Lowell, in the county of Middlesex and State of Massachusetts, have invented certain new and useful Improvements in Fruit-Jars, of which the following is a full, clear, and exact description.

This improvement in fruit-jars consists of a flange or rim around the outside of the neck of the jar, in combination with a cover, a bail or yoke, and a rotatory cam plate or ring, each and all constructed and combined together as hereinafter described.

In the accompanying plate of drawings, Figure 1 is a plan view of a jar with my improved lid and fastening therefor. Fig. 2 is a side view, and Fig. 3 is a cross-section on line 3 3, Fig. 1.

In the drawings, A represents a fruit-jar, having neck B, mouth C, shoulder or ledge D, surrounding outside of neck B, and lid or cover E, all of glass or other suitable material, and made of the usual form. The lid E closes the mouth C of the jar, resting upon the ledge D, having an elastic gasket, *b*, on the outside of the mouth, and in this position it is crossed by a rigid and inflexible yoke or bail-piece, F, engaged with the ledge D, as is ordinarily the case.

G is a plate or ring seated upon the top of the cover, which is recessed at *f* to receive it. This ring G has two raised cam-edges, *g g*, which are diametrically opposite to each other, and each extend in a circular direction around the ring. The ring is formed with upwardly-extending thumb-pieces J, for turning the ring, and also with a bead, K, to fit in the recess *f* of the cover, so as to be guided and prevented from slipping laterally on the cover. With the cam-ring G in position upon the cover and the yoke F on the jar crossing the lid and cam-edges *g g* of the cam-ring G, by turning the cam-ring in one direction the lid and yoke are operated upon to close and fasten and hold the lid upon the jar, and by turning the cam-ring in the opposite direction the lid and yoke are released for removal.

*h h* are a series of notches in the edge of the lid E, and each notch is of suitable shape to receive the leg portion I of the yoke F. The yoke, by its leg portions I, is sprung into notches at opposite points of the lid, and thus it is attached to the lid, and at the same time the cam ring or plate which is on the lid and under the yoke is held against accidental escape, and so that with the lid and yoke removed the several parts are kept together, and, in addition, in securing the lid upon the jar the proper position of the yoke is insured, and it is held against turning. The notches *h* in the edge of the lid also enable a better hold to be obtained on the lid to move it when unfastened, should it adhere to its seat, and, obviously, it is preferable to have the notches about and around the whole edge of the lid.

Having thus described my invention, I claim—

1. The combination, with the jar A, provided with ledge D, and cover E, resting upon said ledge and formed with recess *f*, of the ring G, formed with inclines *g*, thumb-pieces J, and bead K, fitting in recess *f*, and the bail F, fitting across the top of ring G, and having its lower ends turned inwardly and fitted under ledge D, substantially as described.

2. The combination, with jar A, provided with ledge D, and cover E, resting on said ledge and having a serrated periphery, of the ring G, formed with inclines *g*, and the bail F, lying across said ring, with its downwardly-projecting portions fitting in the serrations of the cover and its lower ends turned inwardly and fitting under ledge D, substantially as described.

In testimony whereof I have hereunto set my hand in the presence of two subscribing witnesses.

GEORGE D. COREY.

Witnesses:
 WM. S. BELLOWS,
 ALBERT W. BROWN.